United States Patent [19]
Etter

[11] Patent Number: 6,158,930
[45] Date of Patent: Dec. 12, 2000

[54] ROUTER POSITIONING SYSTEM

[75] Inventor: Mark A. Etter, Jackson, Tenn.

[73] Assignee: Porter-Cable Corporation, Jackson, Tenn.

[21] Appl. No.: 08/971,418

[22] Filed: Nov. 17, 1997

[51] Int. Cl.$^7$ ...................................................... B23C 1/20
[52] U.S. Cl. .............................. 409/180; 33/42; 33/630; 144/136.95; 144/154.5; 409/218; 409/205
[58] Field of Search .................................... 409/180, 182, 409/181, 218, 205; 144/154.5, 136.99, 371, 486; 33/628, 630, 633, 42

[56] References Cited

U.S. PATENT DOCUMENTS 3,376,787  4/1968  Morganson .
3,478,788  11/1969  Zelik .

(List continued on next page.)

OTHER PUBLICATIONS

Router Accessories (Porter–Cable), Jul. 1997, Front Cover, Back Cover, p. 77 (3 pages).
Atlas Copco Literature, first page entitled: Precision at its best (4 pages).
AEG Router & Accessories—OFS 50 (1 page).
Bosch Literature for "Deluxe Router Guide" (1 page).
"Router Bit Sets and Router Accessories" (1 page).
DeWalt Literature, entitled: Router Accessories (1 page).
Festo Literature (1 page).
Hitachi Literature, entitled: Routers (1 page).
Makita Literature entitled: Routers (2 pages).
Metabo Literature (1 page).
Milwaukee Literature, entitled: Heavy Duty Electric Tools For Contractors And Industry (1 page).
Ryobi Literature, entitled: Power Tools (1 page).
Skil Literature, entitled: Power Tools and Accessories (1 page).
Spielman, "Router Handbook", Sterling Publishing Co., Inc. ©1983, pp. 52–100 and 122–135.
Hitachi Power Tools, Catalog No. SD–E301 (4 pages).
Hitachi Router Instruction Manual for Model M12V M12SA and M8V M8.
Porter Cable Routers—Instruction Manual ©1994.
PNI Literature, Re: THE ARC™ (2 pages).
"The Art of Woodworking—Routing and Shaping" from Time–Life Books © 1993, pp. 64–115.
Bosch Literature, entitled: RA 1051 and RA 1052 Deluxe Router Guides . . . (2 pages).
William Alden Company Catalog, dated 1988, pp. 24–25.
Woodhaven™ Literature ©1997 (3 pages).
Woodhaven Catalog Aug. 1993, © 1992 (6 pages).
"Operation of the Modern Router", Stanley © 1971.
DeWalt Parallel Fence with Fine Fence Adjuster DW6912 © 1992.

Primary Examiner—Daniel W. Howell
Attorney, Agent, or Firm—Merchant & Gould P.C.

[57] ABSTRACT

A positioning system adapted for guiding a cutting tool for a portable machine tool such as a router with respect to a workpiece for the purpose of machining the workpiece. The system comprises a rigid slide beam having an elongated configuration, an inner connecting end adapted to be rigidly coupled to the tool, and an outer end defining the length of the rigid slide beam, the rigid slide beam comprising a hollow extruded member. The system also comprises a carriage positioning system adapted to be adjustably secured in positions along the length of the rigid slide beam. The carriage positioning system is coupled to the rigid slide beam in a manner to substantially prevent rotational movement between the carriage positioning system and the rigid slide beam. With the present system, when the rigid slide beam is rigidly coupled to the router or similar tool, the system locates the tool with respect to the carriage positioning system while providing a rigid relationship between the tool and the carriage system, substantially without torque-induced rotational twisting of the positioning system.

36 Claims, 14 Drawing Sheets

6,158,930

U.S. PATENT DOCUMENTS

| Patent No. | Date | Inventor | Class |
|---|---|---|---|
| 3,635,268 | 1/1972 | Lange . | |
| 3,782,431 | 1/1974 | Cox | 144/136.95 |
| 3,893,372 | 7/1975 | Strakeljahn | 409/180 |
| 4,112,987 | 9/1978 | Pachnik . | |
| 4,114,664 | 9/1978 | Cotton . | |
| 4,185,671 | 1/1980 | Cotton . | |
| 4,290,719 | 9/1981 | Worthington et al. . | |
| 4,306,598 | 12/1981 | Peot . | |
| 4,312,391 | 1/1982 | Snow . | |
| 4,410,022 | 10/1983 | Peterson | 409/182 |
| 4,470,439 | 9/1984 | Sanders . | |
| 4,572,715 | 2/1986 | Wolff . | |
| 4,718,468 | 1/1988 | Cowman . | |
| 4,796,682 | 1/1989 | Michaels . | |
| 4,798,506 | 1/1989 | Kulp, Jr. . | |
| 4,911,214 | 3/1990 | Scott . | |
| 4,913,206 | 4/1990 | Altinbasak . | |
| 4,921,023 | 5/1990 | Pempek . | |
| 4,934,422 | 6/1990 | Hempy et al. | 409/182 |
| 4,977,938 | 12/1990 | Greeson . | |
| 5,038,841 | 8/1991 | Larmon . | |
| 5,048,580 | 9/1991 | Smith | 144/371 |
| 5,052,454 | 10/1991 | Meinhardt | 144/136.95 |
| 5,080,152 | 1/1992 | Collins et al. . | |
| 5,123,463 | 6/1992 | Grisley . | |
| 5,139,065 | 8/1992 | Stark . | |
| 5,240,052 | 8/1993 | Davison . | |
| 5,299,609 | 4/1994 | Wedler . | |
| 5,738,470 | 4/1998 | Sugita | 144/371 |
| 5,758,998 | 6/1998 | White | 409/182 |

ROUTER POSITIONING SYSTEM

BACKGROUND AND SUMMARY OF THE INVENTION

The present invention is a positioning system adapted for guiding a cutting tool for a portable machine tool such as a router with respect to a workpiece for the purpose of machining the workpiece. The invention is particularly well adapted for use with a router, laminate trimmer or the like as an edge guide, but it is not limited to such use.

Edge guides are commonly used with portable power tools such as routers, for example, to keep an unpiloted router bit square or parallel to the edge of a workpiece. Typically, a straight fence rides along an edge of the workpiece, starting the cut at one end of the workpiece, and drawing the fence along the edge. Such a router attachment allows edge forming cuts to be made using bits without pilots. An edge guide also is commonly used to make grooves, dadoes, and decorative cuts parallel to the edge of the work.

Most routers are made with provisions for mounting edge guides and other accessories. Typical prior art edge guides employ guide rods that are inserted into predrilled holes in the tool's base plate and serve to both secure the edge guide assembly to the tool, as well as to secure and position the guide fence in relation to the workpiece and the router bit or other cutter.

Such prior art systems that rely on guide rods to secure and position the guide fence are often subject to unbalanced adjustment forces and often are undesirably flexible, causing an unstable system during adjustment or use.

Through a design based on a rigid slide beam, the present invention eliminates such disadvantages and provides a positioning system having more solid and stable positioning of the guide fence or other accessory to the router.

SUMMARY OF THE INVENTION

The present invention is a positioning system adapted for guiding a cutting tool for a portable machine tool such as a router with respect to a workpiece for the purpose of machining the workpiece. The invention comprises a rigid slide beam having an elongated configuration, an inner connecting end adapted to be rigidly coupled to the tool, and an outer end defining the length of the rigid slide beam, the rigid slide beam comprising a hollow extruded member.

The invention also comprises a carriage positioning system adapted to be adjustably secured in positions along the length of the rigid slide beam. The carriage positioning system is coupled to the rigid slide beam in a manner to substantially prevent rotational movement between the carriage positioning system and the rigid slide beam.

With the present invention, when the rigid slide beam is rigidly coupled to the router or similar tool, the system locates the tool with respect to the carriage positioning system while providing a rigid relationship between the tool and the carriage system, substantially without torque-induced rotational twisting of the positioning system.

In a preferred embodiment, the rigid slide beam comprises an extruded aluminum member forming a one-piece extruded structure.

In another preferred embodiment, the present router guide system comprises connecting rods defining threads on one end, the other end of each connecting rod being adapted for insertion into connecting rod apertures located in the base of the router or similar tool. The guide system defines connecting rod apertures having threads that match the threads defined on one end of the connecting rods. Each connecting rod defines at least one flattened portion to accept a wrench for securely attaching the connecting rods to the threaded connecting rod apertures defined in the guide system. In a preferred embodiment, the connecting rods define flatted portions on opposite sides of the rods, so that a wrench may grip two apposite surfaces.

With flattened portions on the connecting rods, a wrench or similar tool can be used to apply significant tightening torque to the rods without causing rod damaging or marring, which typically occurs in the prior art, when round rods are tightened with pliers or other gripping tools.

BRIEF DESCRIPTION OF THE DRAWINGS

Reference is made to the accompanying drawings, which form a part hereof.

DESCRIPTION OF THE PREFERRED EMBODIMENTS

Figure 1:
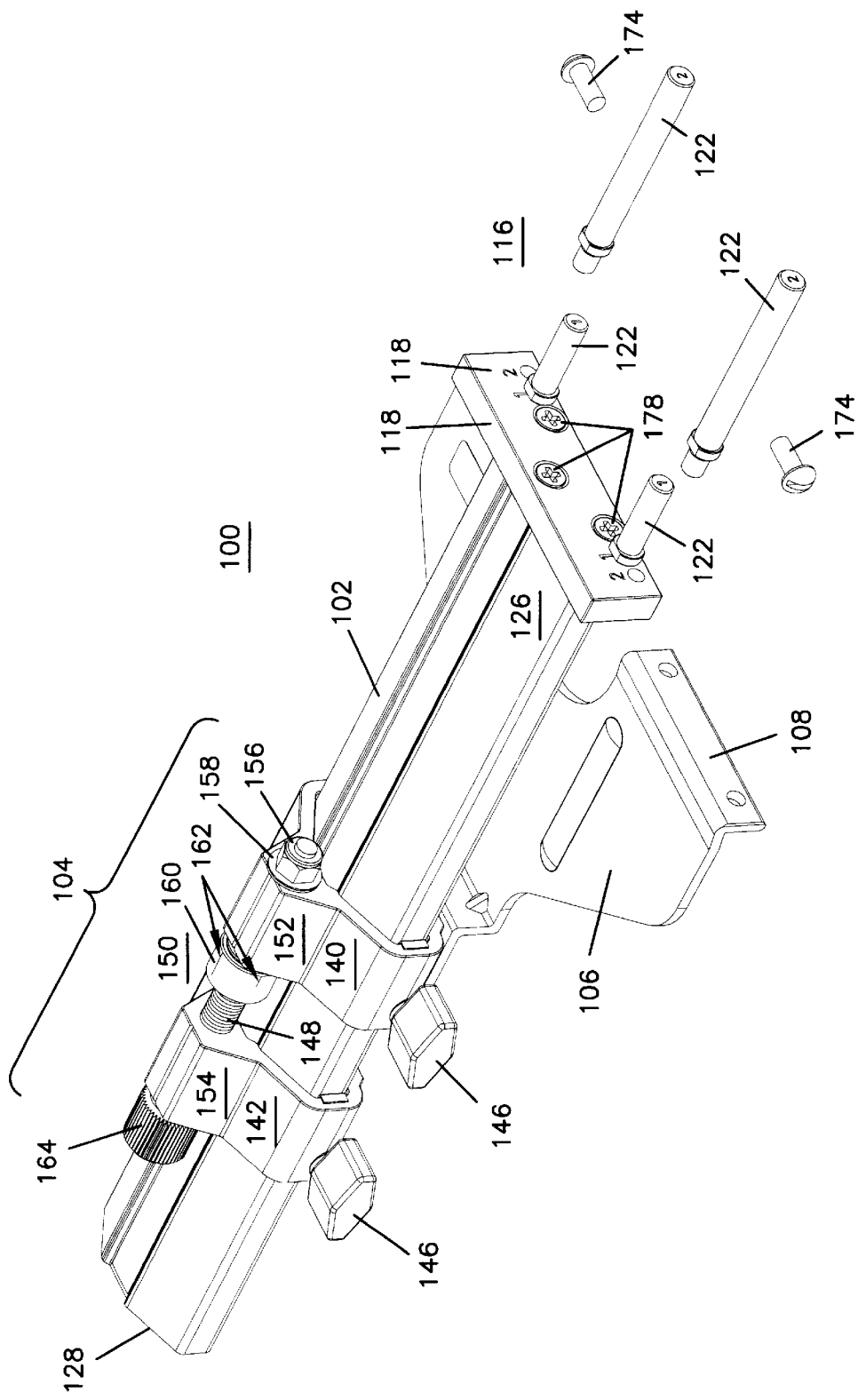
FIG. 1 is a front top left perspective view of a router edge guide having a mounting bar and mounting rods of a first configuration.
Figure 2:
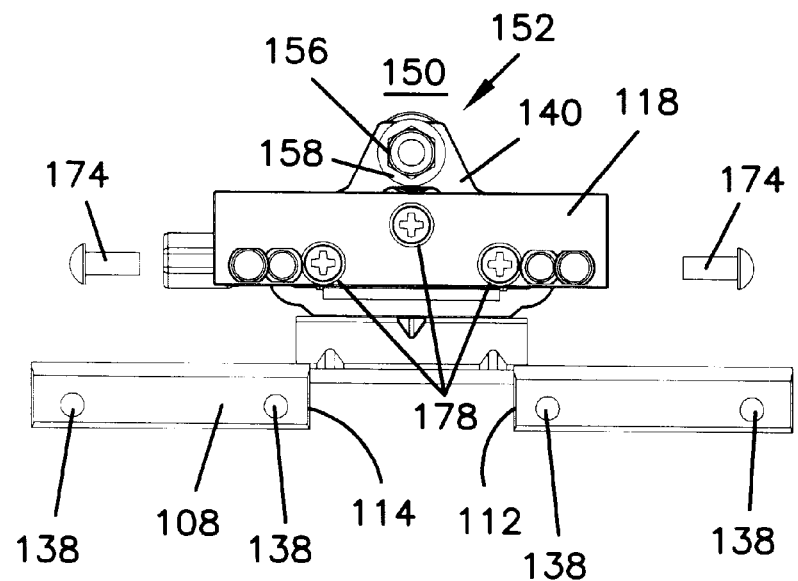
FIG. 2 is a front elevational view of the router edge guide shown in FIG. 1.
Figure 3:
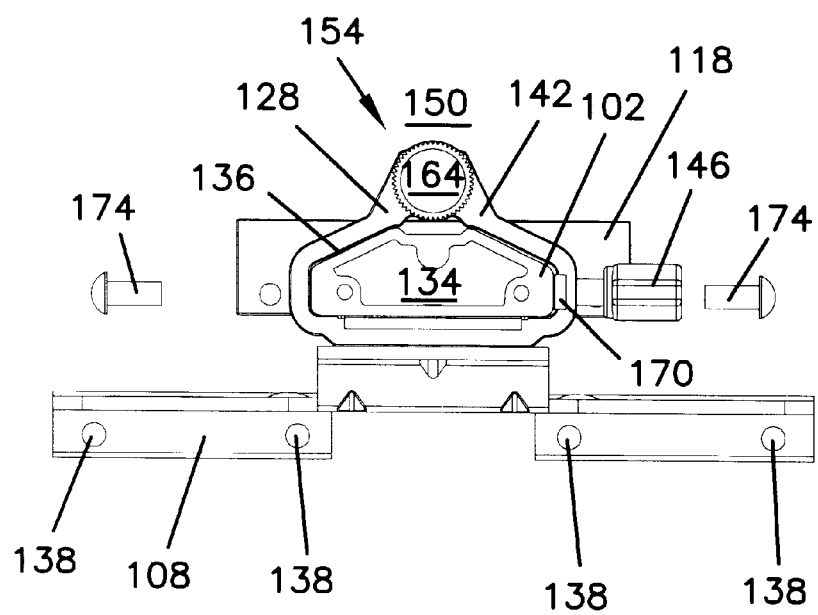
FIG. 3 is a rear elevational view of the router edge guide shown in FIG. 1.
Figure 4:
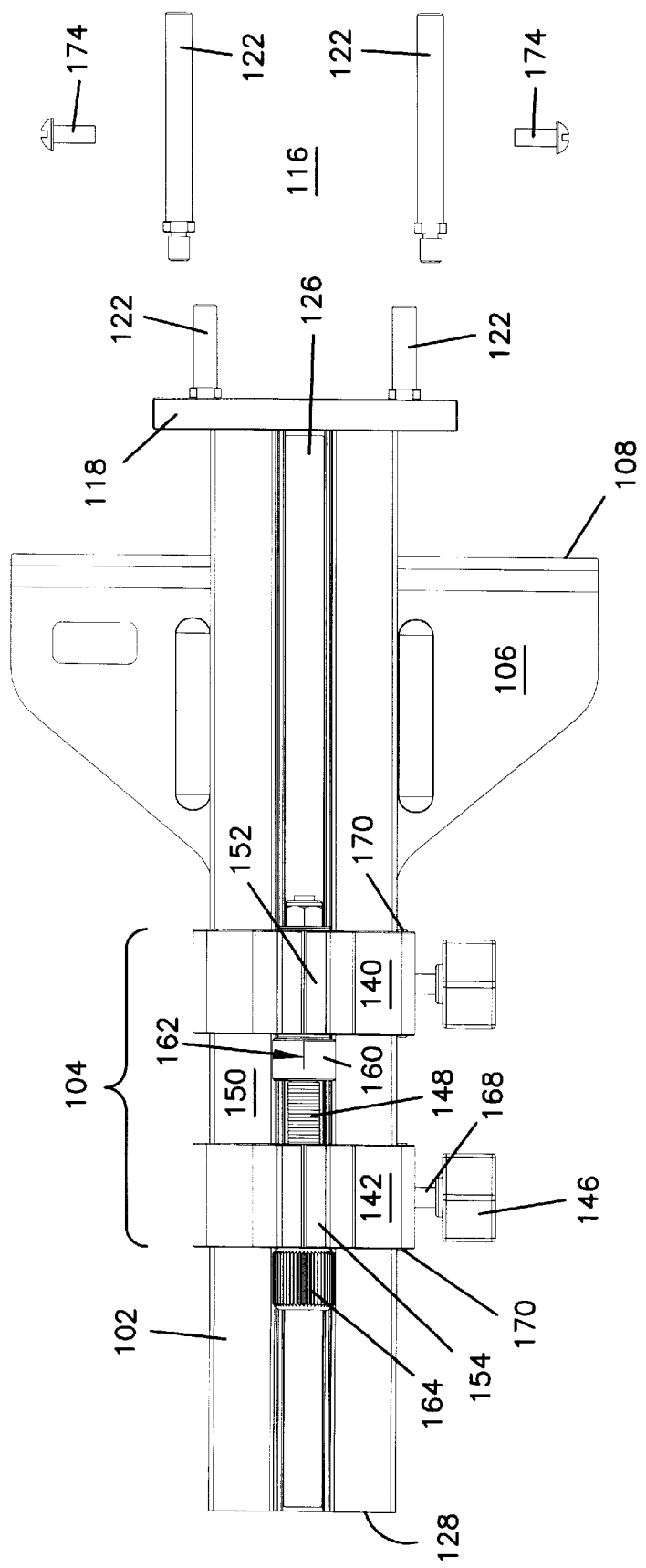
FIG. 4 is a top plan view of the router edge guide shown in FIG. 1.

The present invention is disclosed in the form of a router edge guide 100 having a rigid slide beam having an elongated configuration formed of a hollow extruded member 102, which in the preferred embodiment is extruded from 6063 aluminum. Other forms and materials may also be used for the rigid slide beam, so long as beam 102 is rigid both in torsion and along its length. Rigid slide beam preferably is formed of a one-piece extruded structure.

The invention also comprises a carriage positioning system 104 adapted to be adjustably secured in positions along the length of the rigid slide beam. The carriage positioning system 104 is coupled to the rigid slide beam (member 102) in a manner to substantially prevent rotational movement between the carriage positioning system and the rigid slide beam. In the preferred embodiment, substantial prevention of rotational movement between the carriage positioning system and the rigid slide beam is accomplished by providing a triangulated slide beam configuration having an exterior cross sectional configuration which substantially matches the interior cross sectional configuration of carriage positioning system 104.

Figure 5:
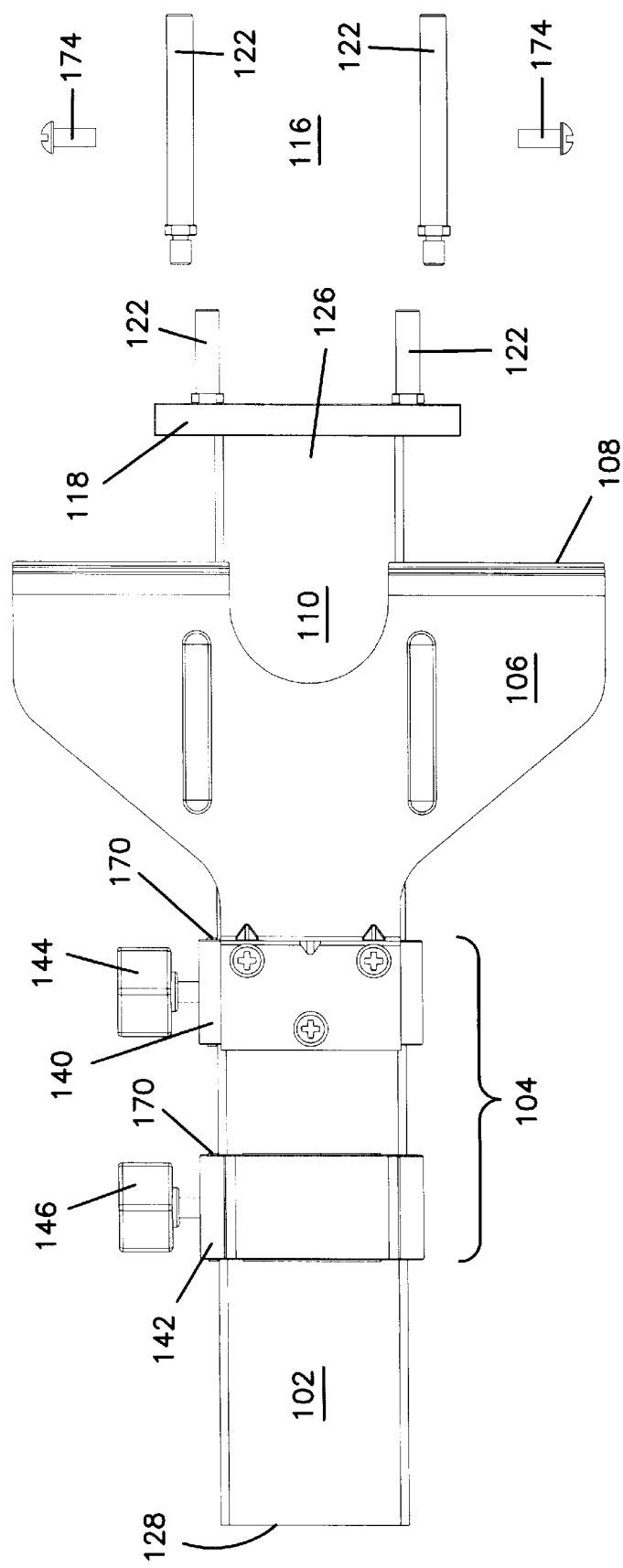
FIG. 5 is a bottom plan view of the router edge guide shown in FIG. 1.
Figure 6:
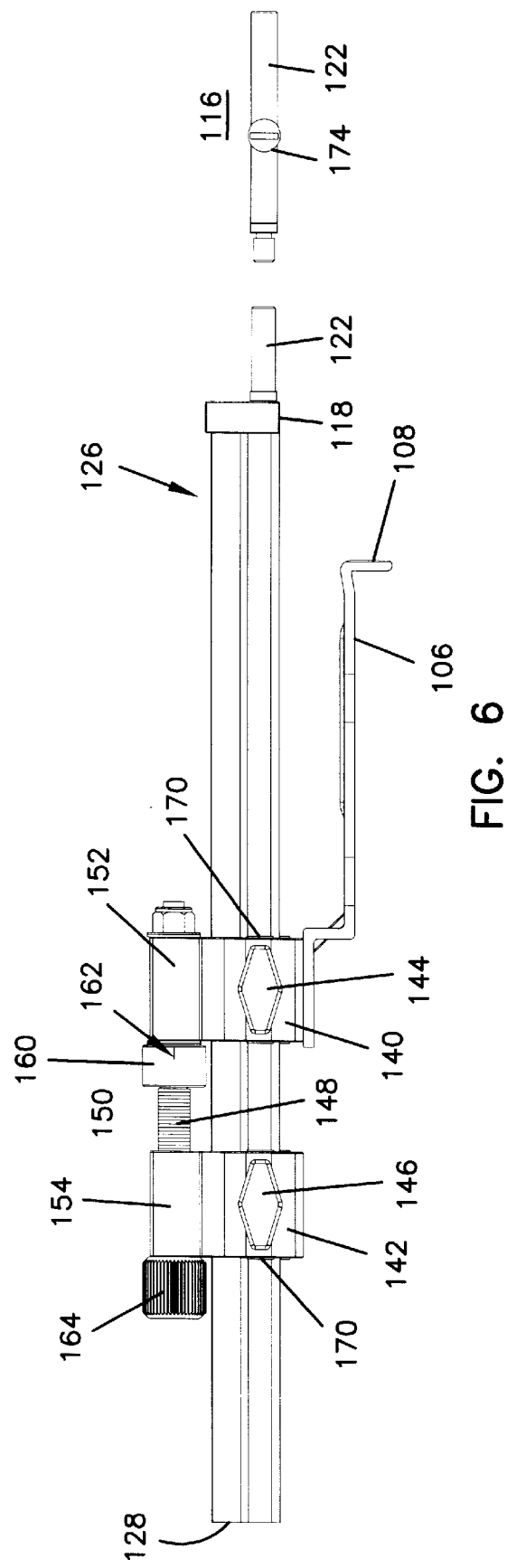
FIG. 6 is a left side elevational view of the router edge guide shown in FIG. 1.
Figure 7:
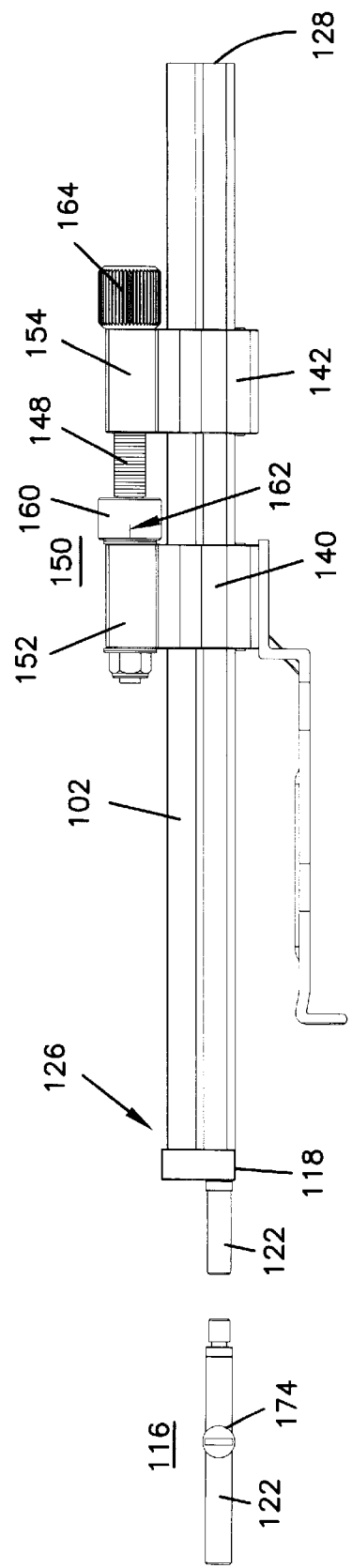
FIG. 7 is a right side elevational view of the router edge guide shown in FIG. 1.

In the disclosed system, an edge guide 106 is rigidly coupled to the carriage positioning system 104. As shown in the drawings, edge guide 106 is secured to carriage system 104 with machine screws 107 (FIG. 5) passing through the underside of guide 106 and into the underside of guide carriage 140.

Figure 15:
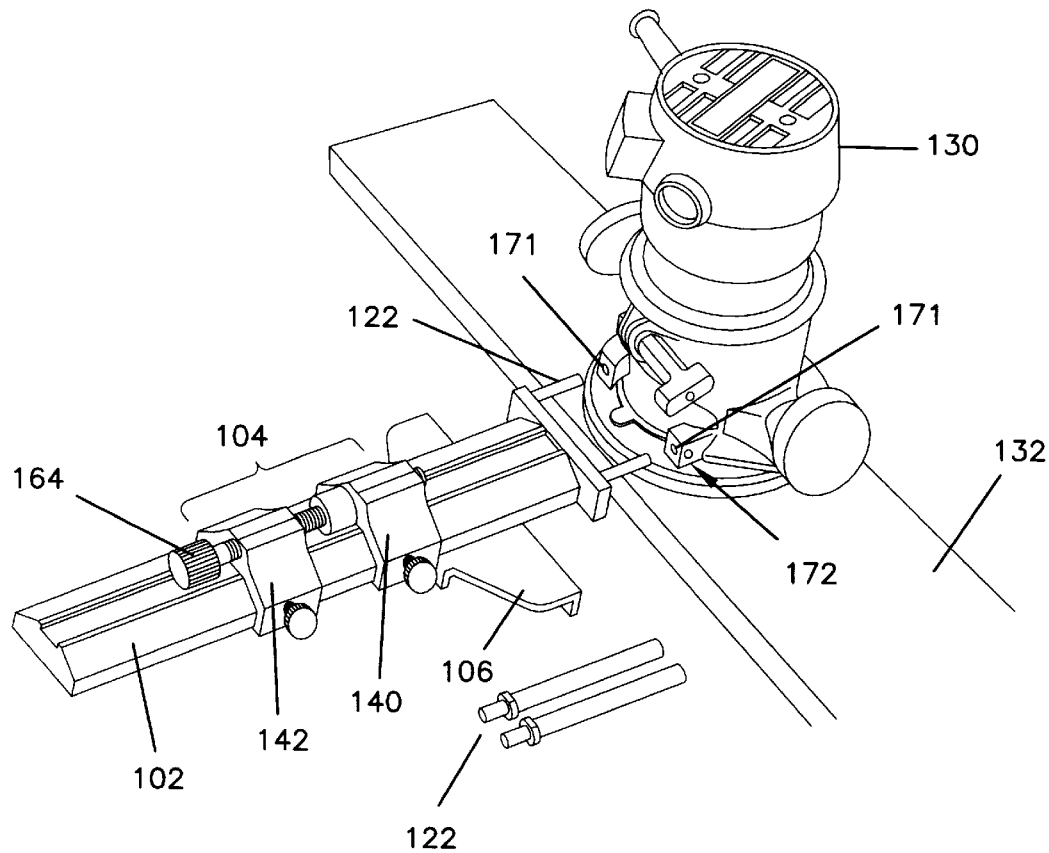
Figure 16:
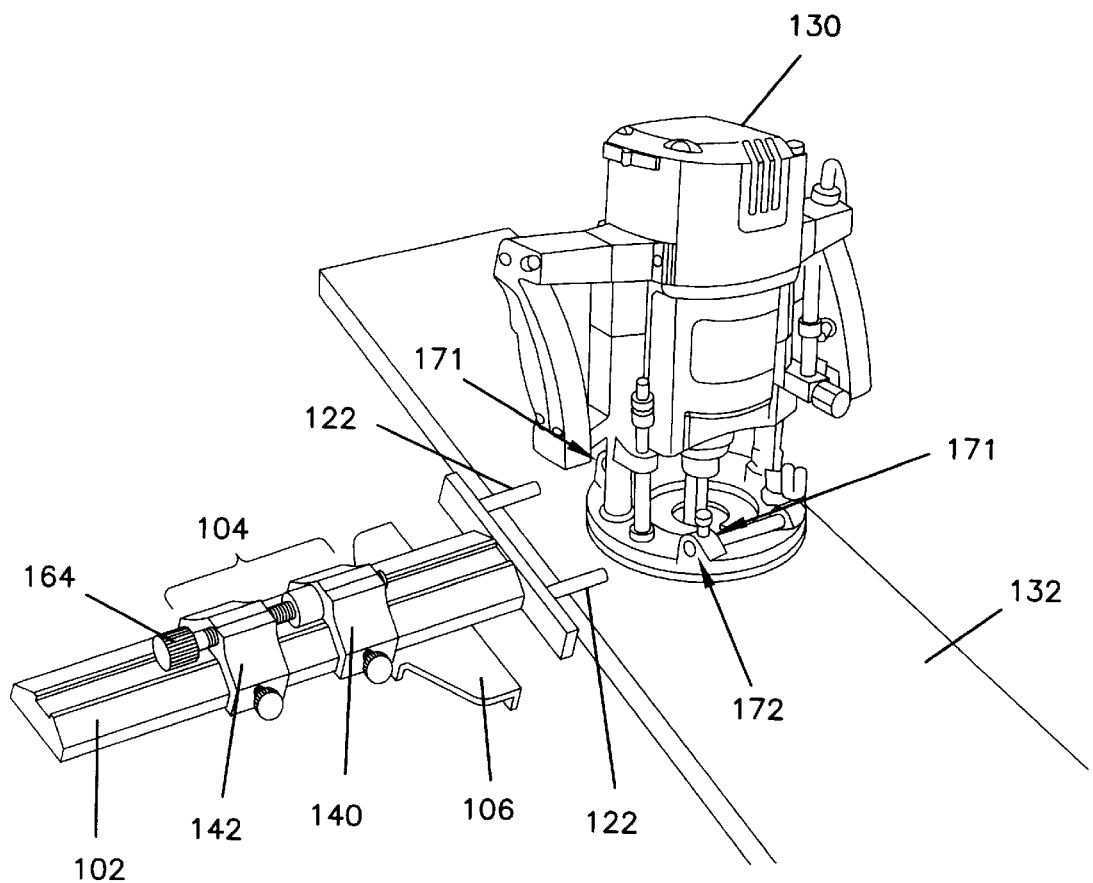

With the present invention, when the rigid slide beam member 102 is rigidly coupled to a router 130 (FIGS 15 and 16) or similar tool, the system locates the tool with respect to the carriage positioning system while providing a rigid relationship between the tool and the carriage system, substantially without torque-induced rotational twisting of the positioning system.

Figure 12:
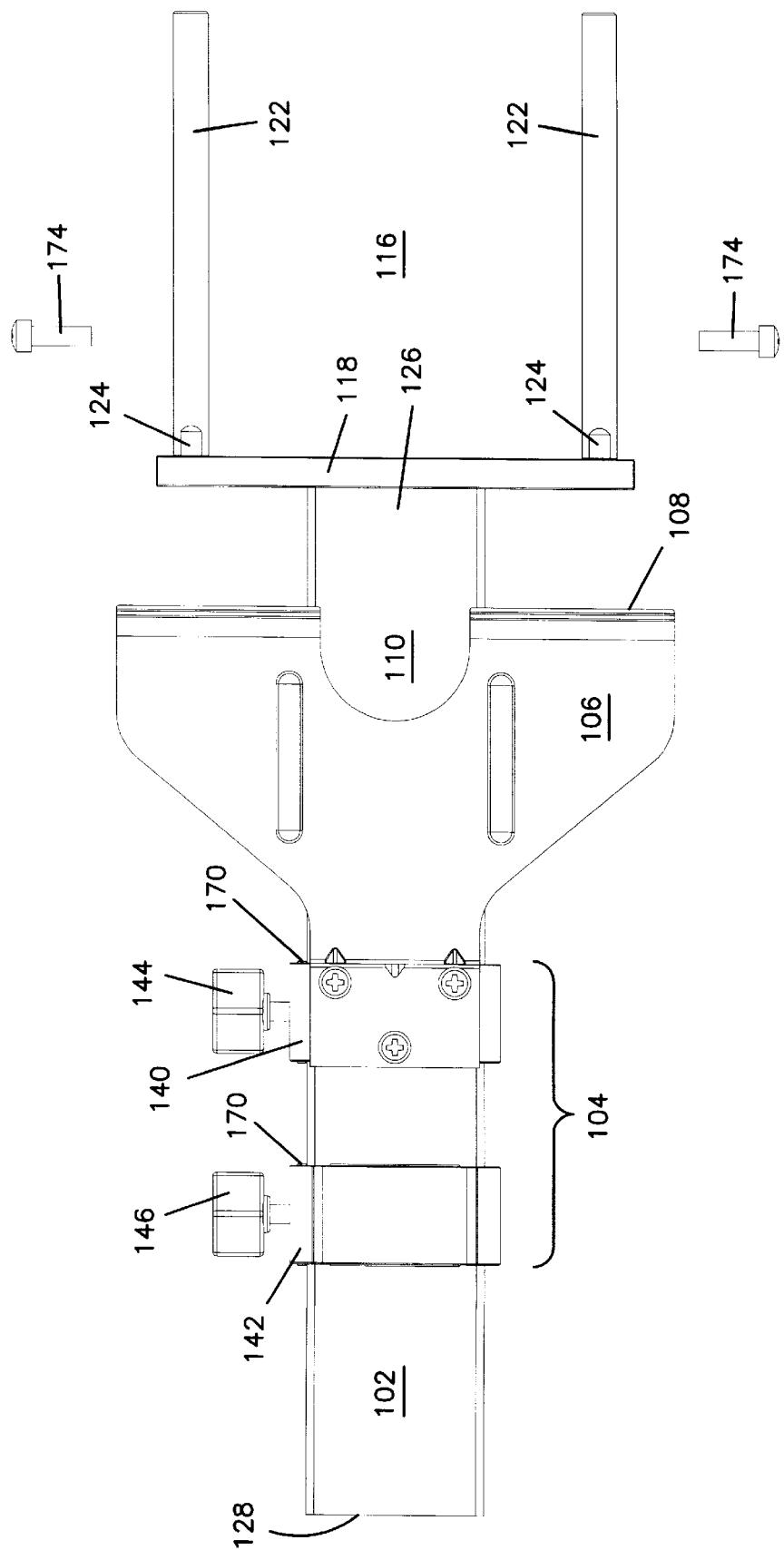
FIG. 12 is a bottom plan view of the router edge guide shown in FIG. 8.
Figure 13:
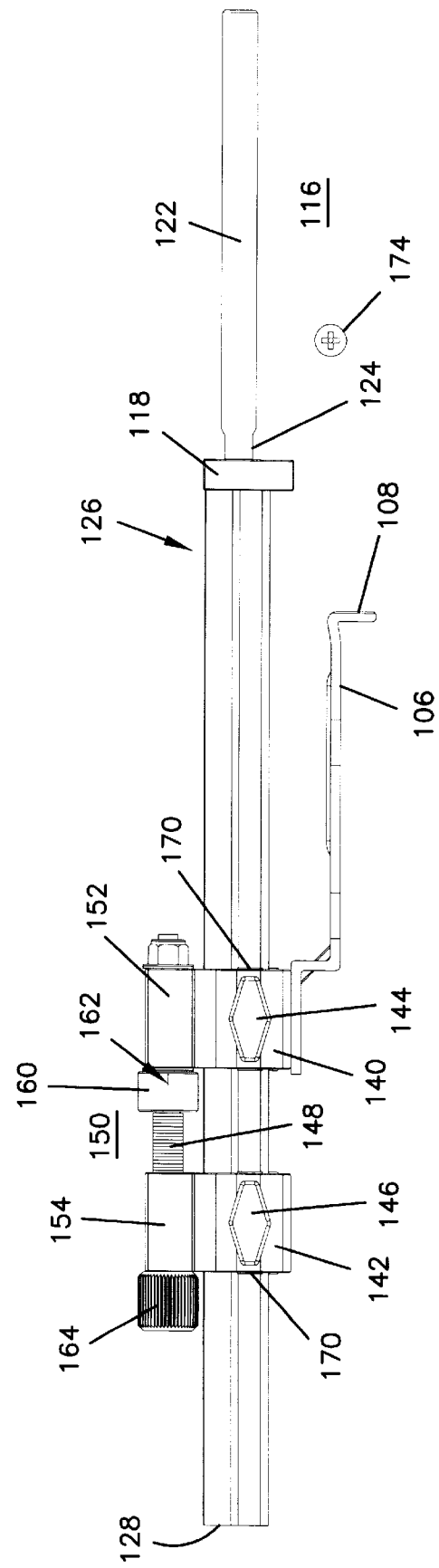
FIG. 13 is a left side elevational view of the router edge guide shown in FIG. 8.
Figure 14:
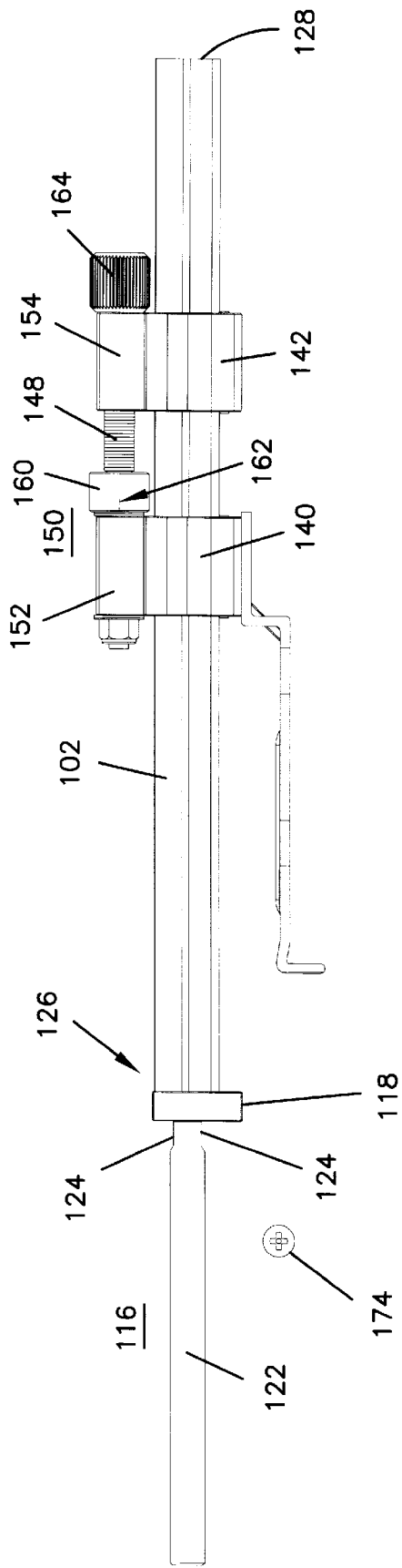
FIG. 14 is a right side elevational view of the router edge guide shown in FIG. 8 and FIGS. 15 and 16 show the alternative disclosed system positioned generally for connection to a router and for use with a workpiece.

The edge guide 106 includes an edge guide fence 108, as with most prior art guide fences, comprises a straight fence edge 109, which typically rides along a substantially straight edge of a workpiece 132 (FIG. 15), starting the cut at one end of the workpiece, and drawing the fence 108 along the edge. Edge guide fence 108 is also shown to comprise a cutout portion such as 110 (FIGS. 5 and 12), which clean the router bit or other cutter.

In the embodiment shown, the present edge guide 106 comprises a tool mounting system 116 adapted to rigidly couple the guide system to the router 130 (FIGS. 15 and 16) or other machine tool. The tool mounting system 116 may comprise a rigid mounting bar 118 adapted to rigidly mount the rigid slide beam to the tool. As is shown in the figures, mounting bar 118 may be rigidly secured to rigid slide beam 102 using machine screws 178 which pass through apertures in the mounting bar and are rigidly secured with slide beam 102.

Mounting bar 118 may define at least one mounting aperture 120 adapted to fixedly couple a mounting connection member 122 to the mounting bar. The at least one mounting connection member is typically configured to have a first end adapted to be rigidly coupled to the mounting bar, typically to at least one mounting aperture in the mounting bar, and a second end adapted to be rigidly coupled to the router or other machine tool.

In the preferred embodiment shown., the at least one mounting connection member comprises two connecting rods 122, each having a threaded end adapted for being securely threaded into appropriately-spaced mounting aperture 120 in the mounting bar. The other end of connecting rods 122 fit with spaced mounting apertures 171 located in the base of router 130 or other tool. With most routers, as with the router 130 shown, threaded rod-securing apertures 172 are also defined by the tool base and intersect at right angles to mounting apertures 171. When connecting rods 122 are inserted within mounting apertures 171, rod-securing machine screws 174 are inserted within rod-securing apertures 172 and are securely tightened against the mounting rods.

As previously indicated, typical prior art edge guides employ guide rods that are inserted into predrilled holes in the tool's base plate and serve to both secure the edge guide assembly to the tool.

In the present invention, if rods such as connecting rods 122 are used for the at least one connection member to rigidly couple the present invention to the router or other machine tool, the rods typically are limited in function to coupling the guide system to the tool, and are not, as typically found in the prior art, also used to connect and position the guide fence. As has been explained previously, in the present invention, through a design based on a rigid slide beam, the present invention eliminates the disadvantages of router guide and similar systems positioned secured with guide rods, and provides a positioning system having more solid and stable positioning of the guide fence or other accessory to the router.

Mounting bars such as 118 are typically provided in the present system as paired apertures 120, with each pair of apertures having a spacing and diameter corresponding to a particular make or brand and model of router or other machine tool. Different length and varying diameter connecting rods 122 can also be configured, depending upon the make or brand and model of router or other tool.

Figure 8:
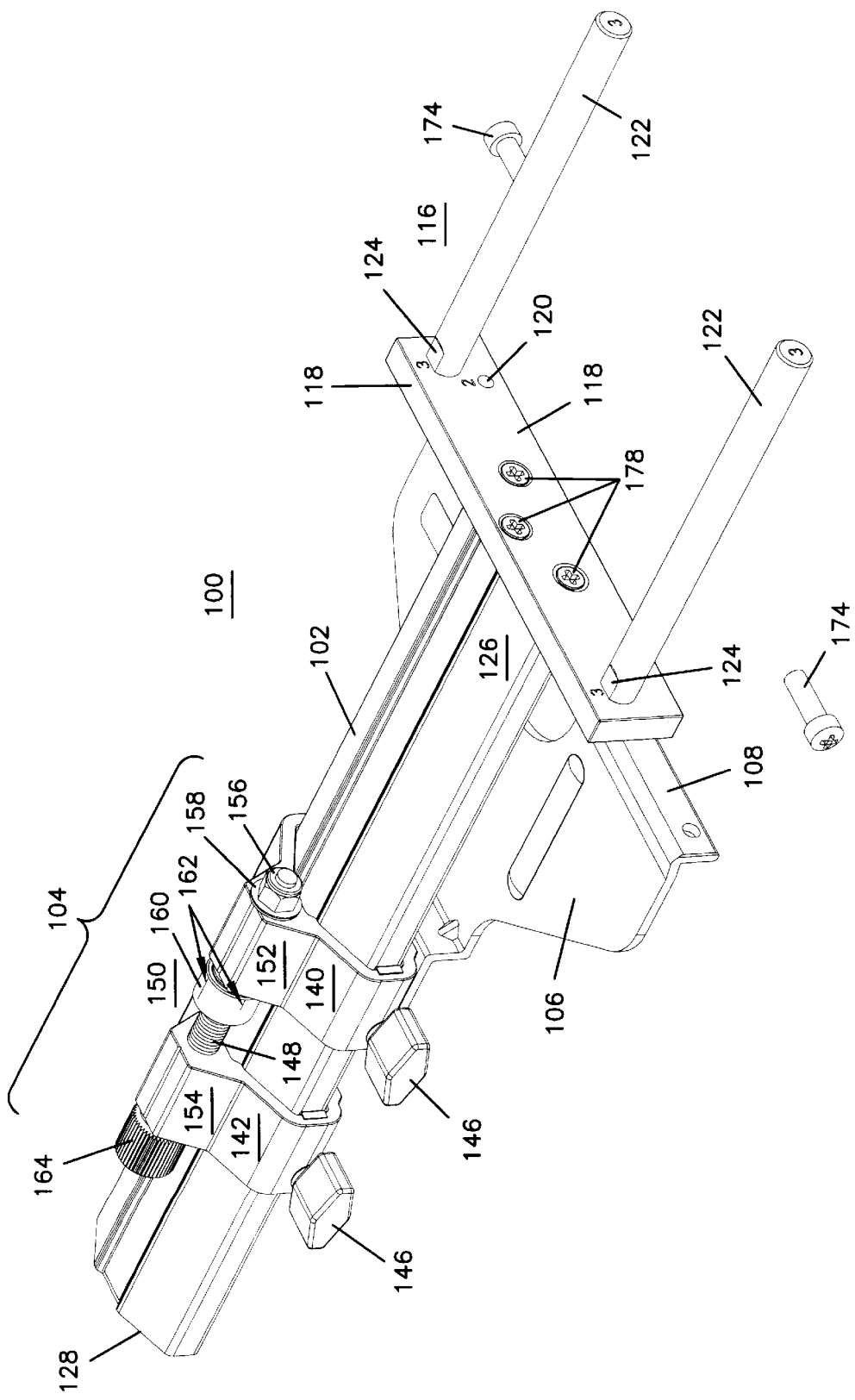
FIG. 8 is a front top left perspective view of a router edge guide having a mounting bar and mounting rods of a second configuration.
Figure 9:
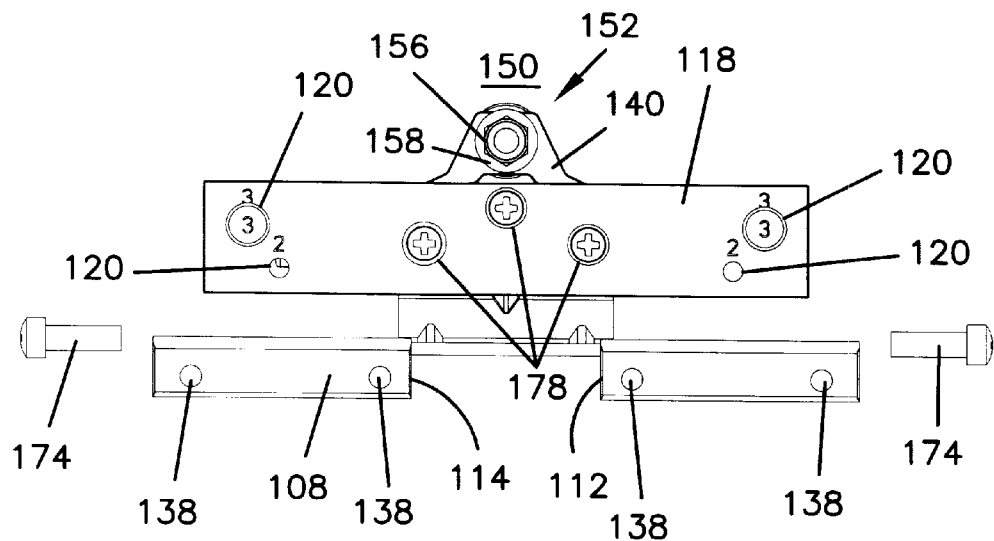
FIG. 9 is a front elevational view of the router edge guide shown in FIG. 8.
Figure 10:
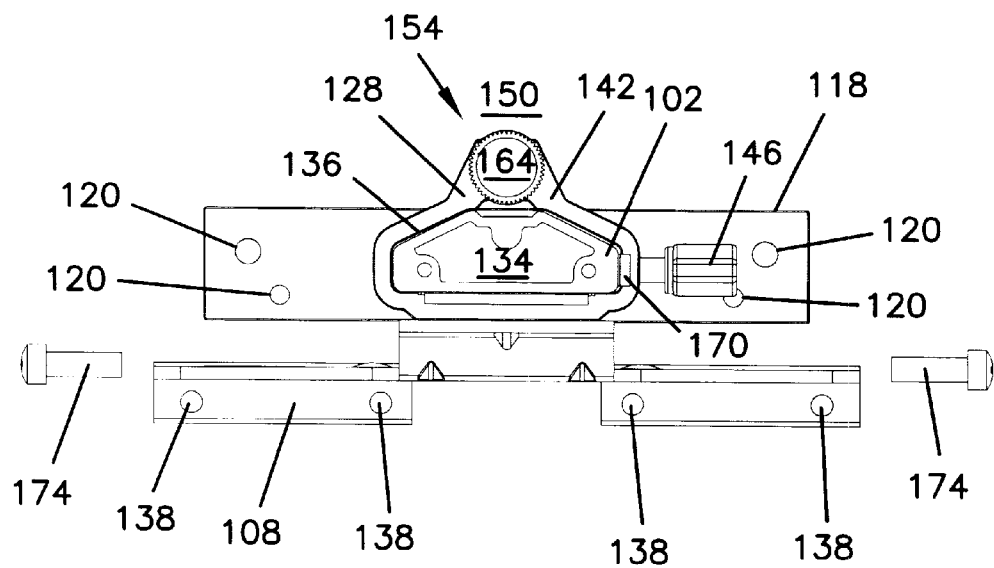
FIG. 10 is a rear elevational view of the router edge guide shown in FIG. 8.
Figure 11:
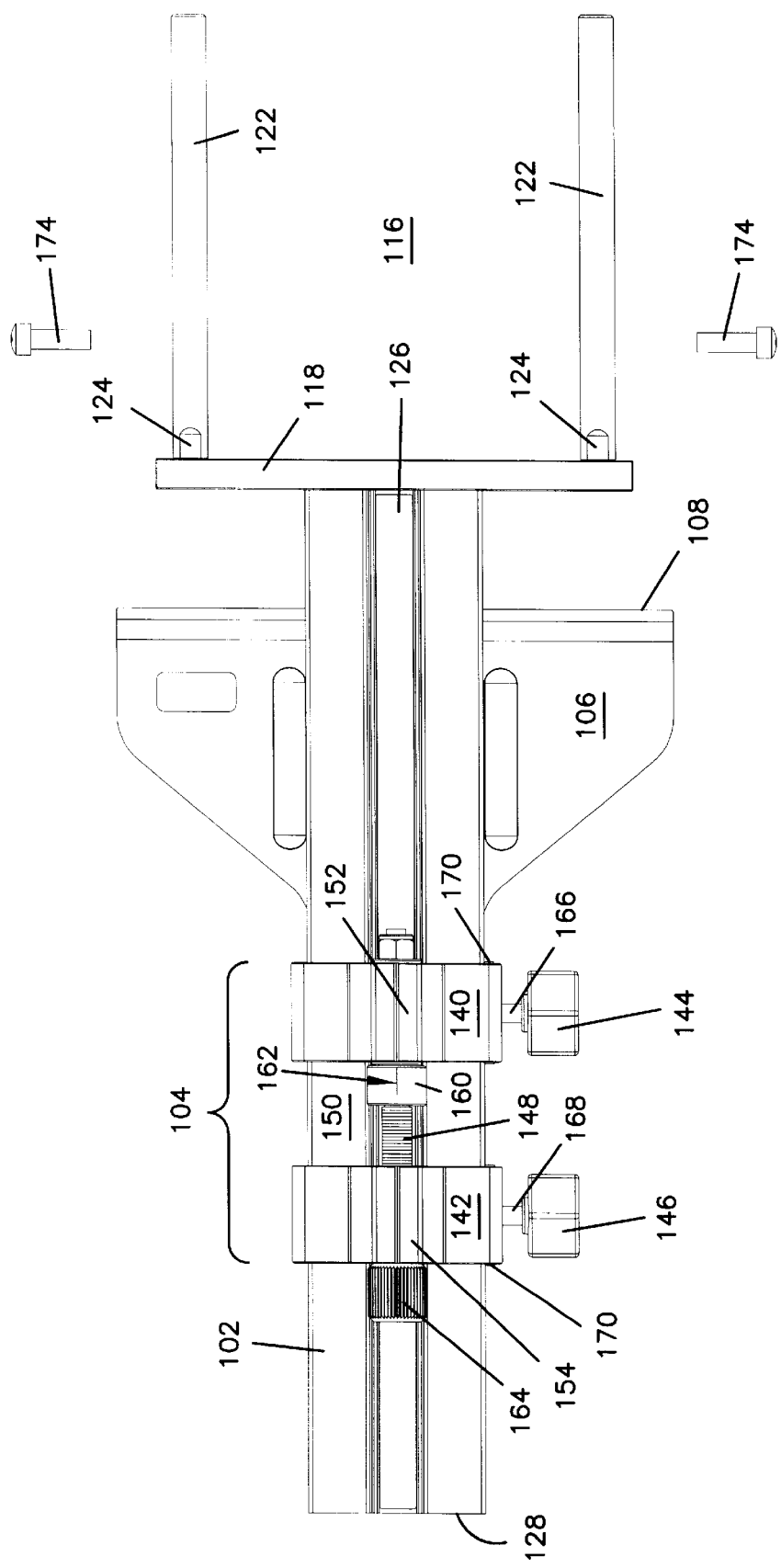
FIG. 11 is a top plan view of the router edge guide shown in FIG. 8.

At the time of filing the present application, Porter-Cable Corporation, the assignee of the present invention, is marketing two models of the disclosed edge guide system. As is shown in FIG. 1, a Model No. 42690 has a mounting bar 118 configured and has mounting apertures 120 spaced and configured for Porter-Cable Model 100, 690, and 693 routers. As is shown in FIG. 8, a Model No. 42700 has a mounting bar 118 configured and has mounting apertures 120 spaced and configured for Porter-Cable Model 7518, 7519, 7536, 7537, 7538, and 7539 routers. These routers are documented in Porter-Cable catalogs and other literature, such as catalog PC-1093 dated July 1997.

At the time of filing the present application, the Model No. 42690 Porter-Cable edge guide included connecting rods in a shorter, smaller-diameter configuration, to be mounted on a shorter spacing between paired apertures 120, for its Model Nos. 100, 690, and 693 routers, and a larger-diameter, longer version, to be mounted in more widely spaced apertures 120, for its Model 691 and Type 4 and 5 router bases. Similar varying connecting rods may eventually be provided with Porter-Cable's Model No. 42700 edge guide.

Porter-Cable may also provide mounting bars such as 118 configured for other makes or brands and models of routers.

In the preferred system, each connecting rod 122 is adapted for rigid connection to the machine tool by inclusion of single or multiple flats such as 124 (FIGS. 8, 11, 12, 13 and 14) configured for grasping with a wrench or similar tool for providing adequate torque to the connecting rods so that they can be securely mounted in mounting bars such as 118.

As previously indicated, the present invention comprises a rigid slide beam member 102 having an elongated configuration, an inner connecting end 126 coupled to the mounting bar, and an outer end 128 defining the length of the rigid slide beam. The rigid slide beam typically defines a particular exterior cross sectional configuration along the length of the beam. In the preferred embodiment, the cross sectional configuration of rigid slide beam member 102 comprises a generally triangular shape, shown at 134 in the drawings.

Carriage positioning system 104 defines an interior cross sectional configuration 136 that substantially matches and slides over the outer cross sectional configuration 134 of the rigid slide beam. As will be further explained below, carriage positioning system 104 is adapted to be adjustably secured in positions along the rigid slide beam.

The sliding interface and the substantially matching cross sectional configuration of the rigid slide beam exterior configuration 134 and the carriage positioning system interior configuration 136, substantially prevent rotational movement between mounting system 116 and the carriage positioning system 104.

Because of the non-rotational interface between the interior and exterior configurations of the carriage system 104 and the rigid slide beam 102, and because of the rigidity in torque and along the length of slide beam 102, when mounting system 116 is rigidly coupled to a router 130 or other tool, the present system locates the tool with respect to the carriage system (and, therefore, with respect to the edge guide 106 and the workpiece 132) with great rigidity. Providing a rigid relationship between the tool and the carriage system 104 and guide 106 through rigid slide beam 102 provides a tool guide system substantially devoid of torque-induced rotational twisting and other uncertainties related to the locking and positioning of the guide with respect to the workpiece. Such rigidity coupled with precision edge guide positioning is typically unavailable in the prior art since typical prior art edge guides, which rely on a relatively unstable system of guide rods for positioning and securing the guide, generally are subject to more flexing and instability than provided by the present system.

As previously indicated, the present system is disclosed in the form of a router edge guide, a system comprising an edge guide 106 defining a guide fence 108 having a surface 109 adapted for movement along an edge of a workpiece, such as workpiece 132, for guiding the router 130 or other machine tool in the direction of movement of the guide fence 108. Apertures 138 are typically provided in the fence 108 in order to enable attaching an auxiliary fence (not shown) to guide the edge 106.

Preferred carriage positioning system 104 comprises a guide carriage 140 and a fine adjust carriage 142. As previously indicated, each carriage defines an interior cross sectional configuration 136 that substantially matches and slides over the outer cross sectional configuration 134 of the rigid slide beam. The carriages are shown spaced longitudinally along rigid slide beam member 102 and being coupled together by a fine adjustment system 150 adapted to make controlled, fine adjustments in the distance between the carriages. Each carriage is adapted to be selectively locked in position along the length of the rigid slide beam using lock knobs 144 and 146.

In the positioning system as configured in the drawings, fine adjustment system 150 is located in a position laterally offset from the geometric center of the rigid slide beam and carriage cross sectional configurations 134 and 136. In the substantially triangular cross configurations shown, fine adjustment system 150 is located above the generally triangular rigid slide beam member 102.

As configured in the preferred embodiment, fine adjustment system 150 comprises a lead screw 148, with each carriage being shown comprising exterior lead screw supports 152 and 154. Each lead screw support defines an aperture, the apertures in each lead screw support 152, 154 being substantially aligned for passage of screw 148.

A first end portion of lead screw 148 comprises a cylindrical portion passing the through the aperture in lead screw support 152 of guide carriage 140. Lead screw 148 is secured from longitudinal movement with respect to the guide carriage 140 while allowing rotation within the guide carriage aperture. In the preferred embodiment, the fixed longitudinal rotation of lead screw 148 is achieved by securing a lock nut 156 and washer 158 on one side of lead screw support 152, with a thrust bearing 160 secured to lead screw 160 on the other side of lead screw support 152.

A second end of lead screw 148 comprises threads that pass through mating threads defined within the aperture in lead screw support 154 of the fine adjust carriage 142. Thrust bearing 160 may have cursor marks 162 located about its circumference to help gage the amount of lead screw rotation and, accordingly, the amount of movement provided by the lead screw. Lead screw 148 is preferably coupled or integral to an adjustment knob at one end of the lead screw. Rotation or adjustment of knob 164 rotates the lead screw threads and causes the carriages to separate or come together, depending upon which direction knob 164 is rotated.

Thrust bearing 160 preferably is in the form of a vernier, which normally follows the rotation of lead screw 148, but which also can be independently rotated by hand with respect to the lead screw, at any start position for fine adjustment, so that cursor marks 162 can be aligned to any desired position, before adjusting knob 164 is rotated in order to provide an initial rotational reference.

Each carriage 140 and 142 defines a threaded lock knob aperture facing toward an exterior surface of the rigid slide beam, with a threaded lock knob aperture being adapted for receiving a threaded lock knob shaft having corresponding threads to the threads defined by the carriage. Shafts are adapted to lock selectively the carriages in place along a surface of rigid slide beam. Both lock knobs are loosened to quickly and qualitatively move the carriage system 104 (and, therefore, edge guide 106) along rigid slide beam member 102. To accomplish a fine, quantitative adjustment, lock knob 146 corresponding to fine adjust carriage 142 is locked first. Fine adjustment of guide carriage 140 (and, therefore, of edge guide 106) is then accomplished by rotating lead screw knob 164. The quantitative amount of movement along rigid slide beam 102 of guide carriage 140 and edge guide 106 may be determined through observation of cursor marks 162 and the number of whole or partial rotations of the lead screw.

At the time of filing the present application, Porter-Cable edge guide Model Nos. 42690 and 42700 employed 16 threads per inch within lead screw support 154 and on the portion of lead screw 148 within support 154. Once fine adjustment has been achieved by rotating the lead screw with knob 164, lock knob 144 corresponding guide carriage 140 may then be tightened. With lock knob 146 corresponding to fine adjust carriage 142 having been locked before fine adjustment, tightening lock knob 144 on guide carriage 140 after fine adjustment ensures that each carriage is individually securely locked, and thus the entire carriage system is locked, to the rigid slide beam.

In the Model No. 42690 and 42700 edge guides available at the time of filing the present application, lock knobs shafts 166 and 168 corresponding to lock knobs 144 and 146 respectively were formed of ¼–20 inch threaded brass, and stainless steel pressure plates 170 were positioned between the end of shafts 166 and 168 and the corresponding surface of rigid slide beam 120. In the preferred embodiment, pressure plates 170 are captured in place within the interface between the corresponding interior surface of the respective carriage 140 or 142 by forming flanges 170 around the exterior sides of both carriages.

The present invention is to be limited only in accordance with the scope of the appended claims, since persons skilled in the art may devise other embodiments still within the limits of the claims.

What is claimed is:

1. A system for positioning a cutting tool adapted to receive a cutter for machining a workpiece, the system comprising:
   a slide beam having a first end and a second end and an exterior;
   a tool mounting system at the first end of the slide beam, the tool mounting system being coupled with the cutting tool;
   a carriage positioning system slidably receiving the slide beam about at least a portion of the exterior, and slidably coupling the slide beam for movement of the carriage positioning system along the slide beam between the first end and the second end of the slide beam; and
   the carriage positioning system being coupled with respect to the slide beam to inhibit torque induced twisting of the slide beam when the slide beam is in operative communication with the cutting tool.

2. The system of claim 1, wherein the slide beam comprises a unitary member.

3. The positioning system of claim 1, additionally comprising:
   an edge guide being adapted for communication with the at least one edge of the workpiece, the edge guide being coupled to the carriage positioning system.

4. The positioning system of claim 3, wherein the edge guide includes a fence, the fence defining a linear surface for riding along the at least one edge of the workpiece.

5. The positioning system of claim 3, wherein the carriage positioning system additionally comprises:
   a positioning carriage in communication with the edge guide; and
   a fine adjust carriage, coupled to the positioning carriage;
   each of the positioning carriage and the fine adjust carriage being of a cross-sectional shape cooperatingly coupled to the cross-sectional shape of the slide beam, such that the positioning carriage and the fine adjust carriage at least partially envelope the slide beam.

6. The positioning system of claim 5, additionally comprising:
   a fine adjust system for coupling the positioning carriage to the fine adjust carriage, the fine adjust system being in a position laterally offset from the geometric center of the slide beam and the positioning carriage and the fine adjust carriage cross-sectional configurations.

7. The positioning system of claim 6, wherein the fine adjust system comprises:
   a lead screw having a first end and a second end;
   the lead screw receiving portions in each of the positioning and fine adjust carriages, the lead screw portions being substantially aligned with each other;
   the first end of the lead screw being threadably engaged for cooperatively passing through the screw receiving portion of the positioning carriage;
   the second end of the screw being threadably engaged for cooperatively passing through the screw receiving portion of the fine adjust carriage;
   the lead screw receiving portions in each of the positioning and fine adjust carriages being threadably engageable such that rotation of the lead screw cooperatively moves at least one of the carriages with respect to the other.

8. The positioning system of claim 7, wherein the fine adjust system additionally comprises:
   a thrust bearing including a vernier, the vernier being adapted for rotating with the lead screw or rotating independently thereof.

9. The positioning system of claim 5, wherein each of the positioning carriage and the fine adjust carriage have an aperture and each of the positioning carriage and the fine adjust carriage includes a system for temporarily retaining the carriage positioning system along the slide beam.

10. The positioning system of claim 9, wherein the temporary retaining system include lock knobs, a portion of each of the lock knobs being threadably engageable to be received in the respective apertures in each of the positioning carriage and the fine adjust carriage.

11. The positioning system of claim 1, wherein the tool mounting system includes a mounting bar connected to the first end of the slide beam, the mounting bar being adapted for coupling with the tool.

12. The positioning system of claim 11, wherein the mounting bar defines at least one mounting aperture, the at least one mounting aperture receiving a mounting connection member; and
   at least one mounting connection member having a first end for being received in the at least one mounting aperture and a second end for coupling with the tool.

13. The positioning system of claim 12, wherein the mounting bar defines a plurality of apertures; and
   the at least one mounting connection member defines a plurality of mounting connection members.

14. The positioning system of claim 13, wherein the mounting connection members comprise:
   flattened portions accepting a wrench or other tool for securing each of the mounting connection members to the mounting bar.

15. A system for positioning a cutting tool adapted to receive a cutter for machining a workpiece, the system comprising:
   a slide beam formed of a unitary member, the slide beam having a first end, a second end and an exterior;
   a tool mounting system located at the first end of the slide beam, the tool mounting system being adapted for coupling with the cutting tool;
   a carriage positioning system including at least one member for slidably receiving the slide beam about at least a portion of the exterior, and slidably coupling with the slide beam for movement of the carriage positioning system along the slide beam between the first end and the second end of the slide beam, the at least one member having an interior cross sectional configuration;
   an edge guide adapted for sliding along the at least one edge of the workpiece, the edge guide being coupled to the at least one member of the carriage positioning system; and
   the interior cross section of the at least one member of the carriage positioning system being correspondingly coupled to the exterior of the slide beam, for inhibiting torque induced twisting of the slide beam when the slide beam is in operative communication with the cutting tool.

16. The system of claim 15, wherein the edge guide includes a first end and a second end, and the edge guide includes a fence at the first end and the edge guide attaches to the carriage positioning system at the second end.

17. A router guide system comprising:
   first and second connecting rods defining threads on one end, the other end of each connecting rod being adapted for insertion into connecting rod apertures located in the base of the router or other similar tool;
   the guide system defining connecting bar apertures having threads that match the threads defined on the one end of the connecting rods;
   wherein each connecting rod defines at least one flattened portion to accept a wrench for securely attaching the connecting rods to the threaded connecting rod apertures defined in the guide system.

18. The router guide system of claim 17 wherein the connecting rods each define flatted portions on opposite sides of the rods, so that a wrench may grip two apposite surfaces.

19. The router guide system of claim 17 wherein the guide system comprises a rigid mounting bar which defines the connecting rod apertures.

20. A system for positioning a cutting tool adapted to receive a cutter for machining a workpiece, the system comprising:

a slide beam having a first end and a second end;

a tool mounting system at the first end of the slide beam, the tool mounting system being adapted for coupling with a cutting tool;

a carriage positioning system slidably coupled to the slide beam, the carriage positioning system being adapted for moving between the first end and the second end of the slide beam;

an edge guide being adapted for communication with the at least one edge of the workpiece, the edge guide being coupled to the carriage positioning system; and the carriage positioning system being coupled to the slide beam to inhibit torque induced twisting of the slide beam when the slide beam is in operative communication with the cutting tool.

21. The system of claim 20, wherein the slide beam comprises a unitary member.

22. A system for positioning a cutting tool adapted to receive a cutter for machining a workpiece, the system comprising:

a slide beam having a first end and a second end;

a tool mounting system at the first end of said slide beam, said tool mounting system being adapted for coupling with the cutting tool;

a carriage positioning system slidably coupled to the slide beam, the carriage positioning system being adapted for moving between the first end and the second end of the slide beam; and the carriage positioning system being coupled to the slide beam to inhibit torque induced twisting of the slide beam when the slide beam is in operative communication with the cutting tool.

23. The system of claim 22, wherein the slide beam comprises a unitary member.

24. The positioning system of claim 22, additionally comprising:

an edge guide being adapted for communication with the at least one edge of the workpiece, the edge guide being coupled to the carriage positioning system.

25. The positioning system of claim 24, wherein the edge guide includes a fence, the fence defining a linear surface for riding along the at least one edge of the workpiece.

26. The positioning system of claim 24, wherein the carriage positioning system additionally comprises:

a positioning carriage in communication with the edge guide; and a fine adjust carriage, coupled to the positioning carriage;

each of the positioning carriage and the fine adjust carriage being of a cross-sectional shape that is cooperatingly coupled to the cross-sectional shape of the slide beam, such that the positioning carriage and the fine adjust carriage at least partially envelope the slide beam.

27. The positioning system of claim 26, additionally comprising:

a fine adjust system for coupling the positioning carriage to the fine adjust carriage, the fine adjust system being in a position laterally offset from the geometric center of the slide beam and the positioning carriage and the fine adjust carriage cross-sectional configurations.

28. The positioning system of claim 27, wherein the fine adjust system comprises:

a lead screw having a first end and a second end;

the lead screw receiving portions in each of the positioning and fine adjust carriages, the lead screw portions being substantially aligned with each other;

the first end of the lead screw being threadably engaged for cooperatively passing through the screw receiving portion of the positioning carriage;

the second end of the lead screw being threadably engaged for cooperatively passing through the screw receiving portion of the fine adjust carriage;

the lead screw receiving portions, in each of the positioning and fine adjust carriages, being threadably engageable such that rotation of the lead screw cooperatively moves at least one of the carriages with respect to the other.

29. The positioning system of claim 28, wherein the fine adjust system additionally comprises:

a thrust bearing including a vernier, the vernier being adapted for rotating with the lead screw or rotating independently thereof.

30. The positioning system of claim 26, wherein each of the positioning carriage and the fine adjust carriage define an aperture, and each of the positioning carriage and the fine adjust carriage includes a system for temporarily retaining the carriage positioning system along the slide beam.

31. The positioning system of claim 30, wherein the temporary retaining system include lock knobs, a portion of each of the lock knobs being threadably engageable to be received in the respective apertures in each of the positioning carriage and the fine adjust carriage.

32. The positioning system of claim 22, wherein the tool mounting system includes a mounting bar connected to the first end of the slide beam, the mounting bar being adapted for coupling with the tool.

33. The positioning system of claim 32, wherein the mounting bar defines at least one mounting aperture, the at least one mounting aperture receiving a mounting connection member; and at least one mounting connection member having a first end for being received in the at least one mounting aperture and a second end for coupling with the tool.

34. The positioning system of claim 33, wherein the mounting bar defines a plurality of apertures; and the at least one mounting connection member includes a plurality of mounting connection members.

35. The positioning system of claim 34, wherein the mounting connection members comprise:

flattened portions being configured for accepting a wrench or other tool for securing each of the mounting connection members to the mounting bar.

36. The positioning system of claim 20, wherein the edge guide includes a fence, the fence defining a linear surface for riding along the at least one edge of the workpiece.

* * * * *